(12) United States Patent
Ostermann

(10) Patent No.: US 6,521,847 B1
(45) Date of Patent: Feb. 18, 2003

(54) TIPPING BALANCE SCALE FOR WEIGHING MOVING OBJECTS

(76) Inventor: Jerry L. Ostermann, 1155 N. 100th Rd., Sylvan Grove, KS (US) 67481-9305

( * ) Notice: Subject to any disclaimer, the term of this patent is extended or adjusted under 35 U.S.C. 154(b) by 0 days.

(21) Appl. No.: 09/933,560

(22) Filed: Aug. 20, 2001

(51) Int. Cl.[7] ............................................. G01G 19/00
(52) U.S. Cl. ...................... 177/134; 177/145; 177/161; 177/255; 177/DIG. 9
(58) Field of Search ................................ 177/132, 133, 177/134, 135, 119, 145, 161, 162, 163, 184, 187, 188, 189, 255, DIG. 9

(56) References Cited

U.S. PATENT DOCUMENTS

| | | | |
|---|---|---|---|
| 2,035,982 A | 3/1936 | Robinson et al. | 177/255 |
| 2,204,389 A | 6/1940 | Vater et al. | 177/256 |
| 3,584,503 A | 6/1971 | Senour | 73/65.06 |
| 4,533,008 A | 8/1985 | Ostermann | 177/132 |
| 4,836,304 A | 6/1989 | Paul | 177/185 |
| 5,086,856 A * | 2/1992 | Haggstrom | 177/161 |
| 5,101,982 A * | 4/1992 | Gentili | 177/145 |
| 5,340,950 A * | 8/1994 | Brandorff et al. | 177/145 |
| 5,856,637 A | 1/1999 | Vande Berg | 177/145 |
| 5,949,031 A | 9/1999 | Vande Berg | 177/16 |
| 2001/0037960 A1 * | 11/2001 | Ratesic | |

OTHER PUBLICATIONS

U.S. Patent Application Publication US 2001/0037960 A1, Ratesic, Nov. 8, 2001.*

* cited by examiner

*Primary Examiner*—Randy W. Gibson
(74) *Attorney, Agent, or Firm*—Shughart, Thomson & Kilroy, P.C.; Mark L. Kleypas

(57) ABSTRACT

A scale is disclosed for weighing moving loads. The scale includes a weighing platform having entrance and exit ends. The platform is connected to a tipping member mounted to pivot about a fulcrum. A weighing device is operatively connected to the fulcrum. Downward movement of the platform entrance end causes the tipping member to pivot in a first direction and downward movement of the platform exit end causes the tipping member to pivot in a second direction. First and second stops limit movement of the tipping member in the first and second directions, respectively. As a load enters the platform, the tipping member pivots against the first stop such that the weight is distributed between the fulcrum and the stop. As the load approaches the center of the platform, the tipping member pivots off of the first stop such that the weight is measurable by the weighing device.

20 Claims, 8 Drawing Sheets

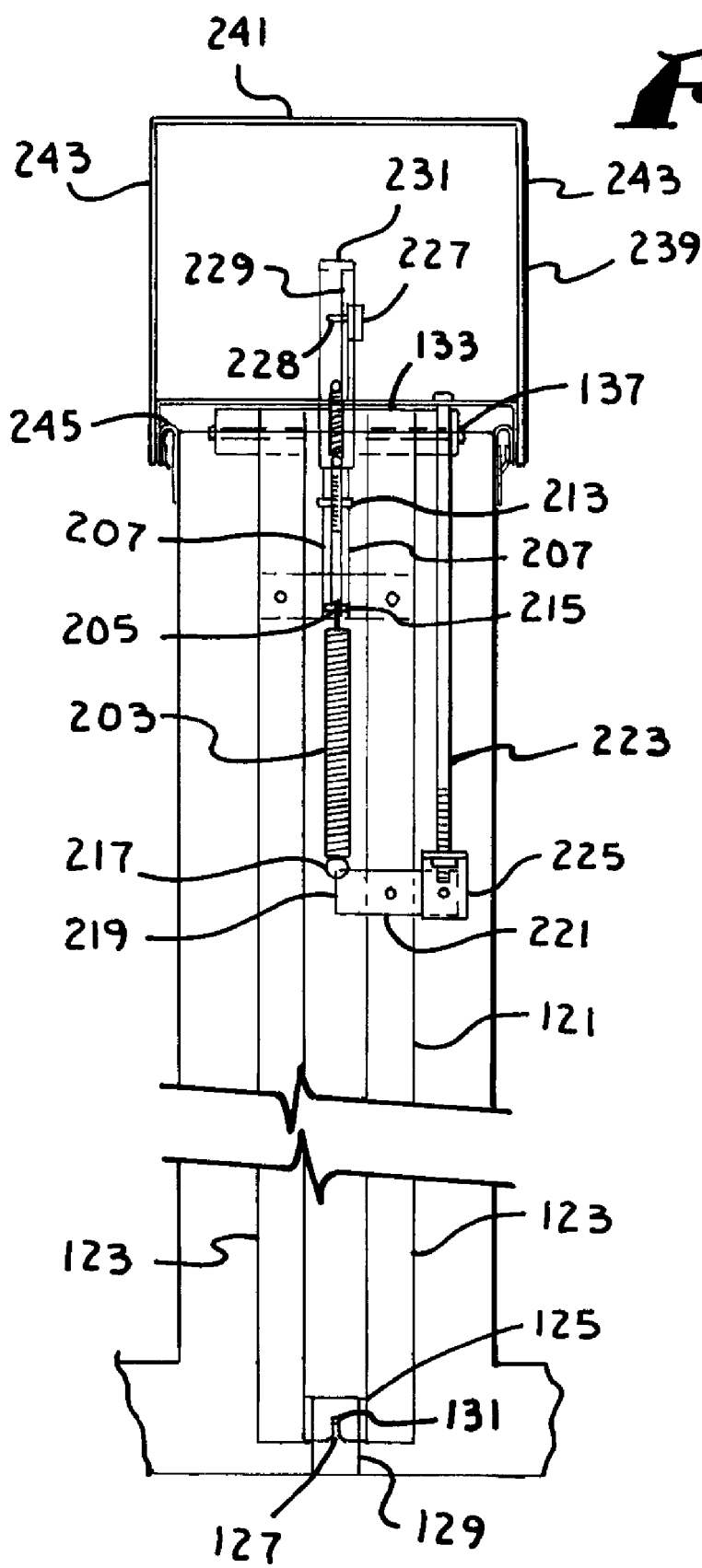

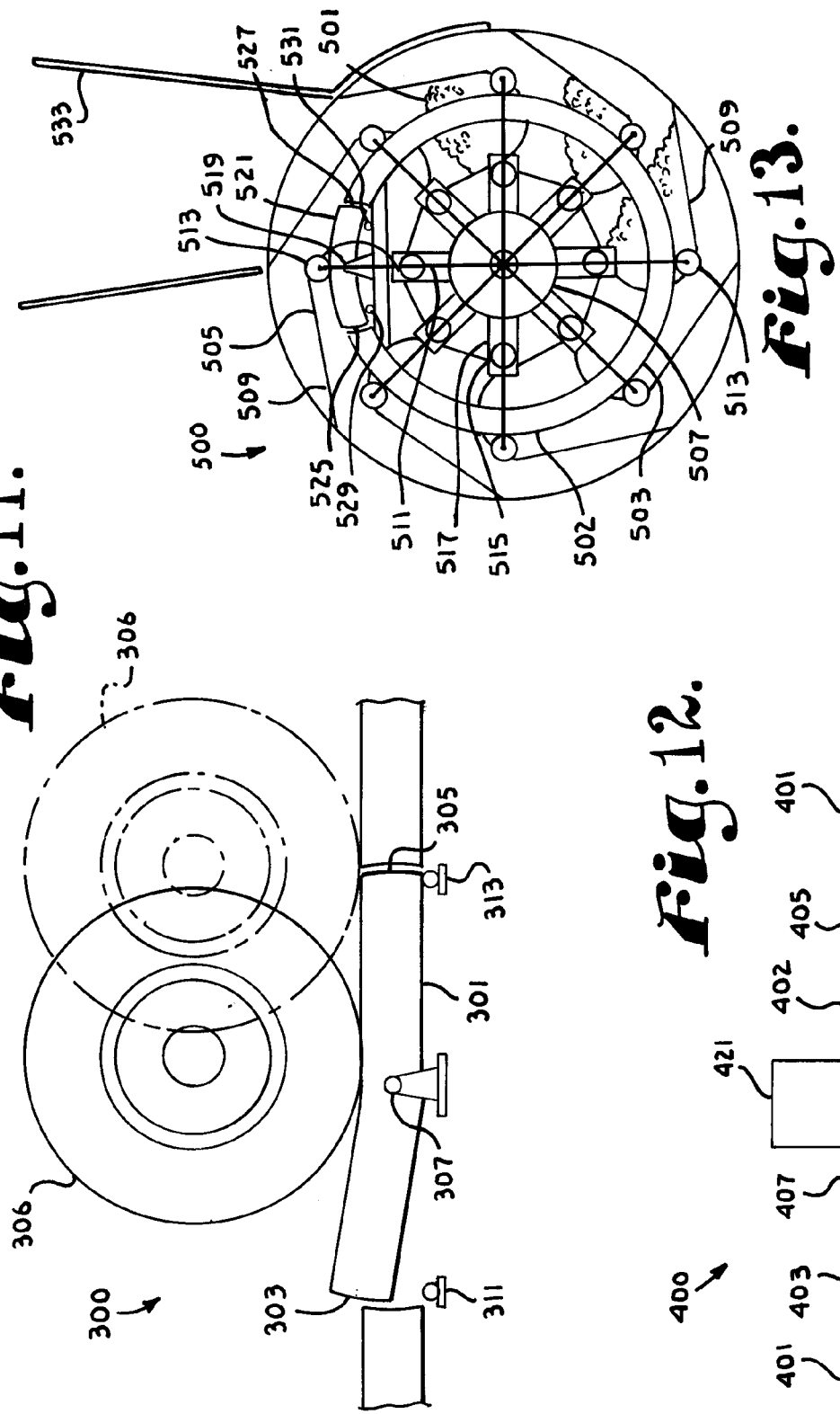

TIPPING BALANCE SCALE FOR WEIGHING MOVING OBJECTS

BACKGROUND OF THE INVENTION

1. Field of the Invention

The present invention relates to a scale mechanism for weighing either animate or inanimate objects as they are moved across a scale platform.

2. Description of the Related Art

Scales for weighing moving objects such as livestock, wheeled vehicles, or packages moving along a conveyor line generally include a weighing platform across which the object moves as it is being weighed. (As used herein the term "platform" can include a section of rail or track, a tube, or any structure across or through which an item to be weighed can be moved.) The weighing platform is connected to a weighing device such as a spring scale, balance, or load cell for measuring the weight acting on the platform. Prior art scales have attempted to suspend the platform in such a manner that the weighing device can register all of the weight on the platform, no matter where the object is positioned on the platform. Scales of this type have a major disadvantage in that any shock loads acting on the platform are transferred to the weighing device. Shock loads primarily occur when the object is placed on or enters the platform and when the object is removed from the platform. When the load being weighed comprises live animals, shock loads can also occur as the animal moves about on the platform. Shock loads transmitted to the weighing device cause erratic readings to be registered by the weighing device and thereby cause inaccuracy of the weight measurement. Shock loading can also damage the weighing device and lead to its premature failure.

What is needed is a scale mechanism which isolates the weighing device from the majority of shock loads so that accurate weight readings can be obtained.

SUMMARY OF THE INVENTION

The present invention comprises a scale for weighing moving objects in which the weight of the object is gradually transferred onto the weighing device and then gradually transferred off of the weighing device after a weight measurement is taken. The scale drastically reduces shock loading of the weighing device. The scale includes a weighing platform having an entrance end and an exit end. The platform is connected to a tipping balance member having a first end and a second end. The tipping balance member is mounted for pivotal rotation about a fulcrum intermediate the first and second ends. The tipping balance member is connected to the weighing platform such that downward movement of the platform entrance end causes the tipping balance member to pivot in a first direction and downward movement of the platform exit end causes the tipping balance member to pivot in a second direction opposite the first direction. A weighing device is operatively connected to the fulcrum so as to measure weight acting on the fulcrum. A first limit stop is positioned to limit movement of the tipping balance member in the first direction. Similarly, a second limit stop is positioned to limit movement of the tipping balance member in the second direction.

As a load enters the platform from the entrance end, its weight initially pushes downwardly on the entrance end and thereby pivots the tipping balance member in the first direction and against the first limit stop such that a portion of the weight bears against the first limit stop. As the load continues across the platform its weight gradually shifts from the entrance end of the platform to the exit end. As the weight is redistributed, the tipping balance member pivots in the second direction and off of the first limit stop. Once the tipping balance member clears the first limit stop, the weighing device can measure the weight of the load. As the load continues to move toward the exit end of the platform, a sufficient portion of the weight shifts to said exit end to move the exit end downwardly. Downward movement of the exit end causes the tipping balance member to pivot in the second direction and against the second limit stop such that a portion of the weight bears against the second limit stop. The weight of the load is then gradually transferred from the fulcrum to the second limit stop until the load exits the platform.

BRIEF DESCRIPTION OF THE DRAWINGS

FIG. 10 is a fragmentary right side view of the scale of FIG. 3 with portions removed to show the details of the scale mechanism.

FIG. 11 is a schematic representation of a scale for weighing wheeled loads embodying the concept of FIGS. 1a–1c.

FIG. 12 is a schematic representation of a conveyor scale embodying the concept of FIGS. 1a–1c.

FIG. 13 is a schematic representation of a rotary scale for weighing granular material which incorporates the concept of FIGS. 1a–1c.

DETAILED DESCRIPTION OF THE PREFERRED EMBODIMENTS

I Introduction

Figure 1A:
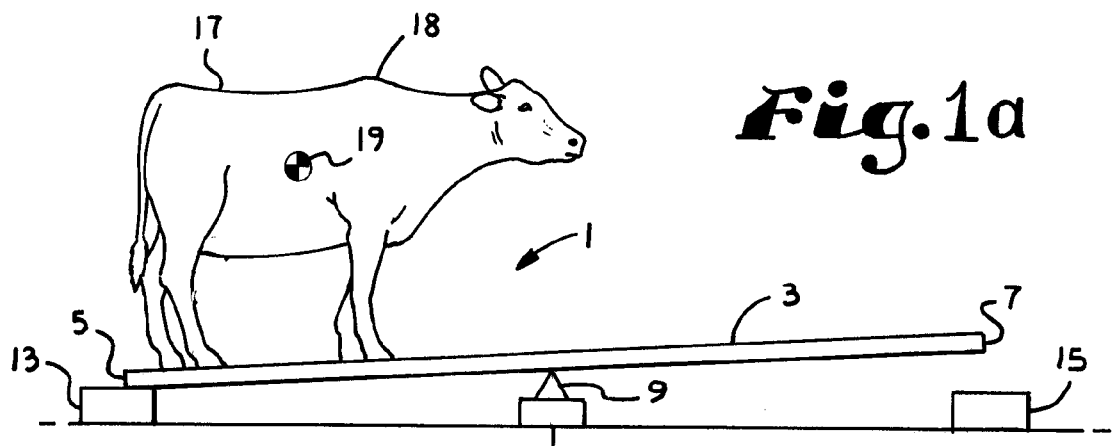
FIGS. 1a–1c are schematic representations of a scale disclosing the basic concept of the present invention and showing the action of the scale as a load moves across the weighing platform.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1B:
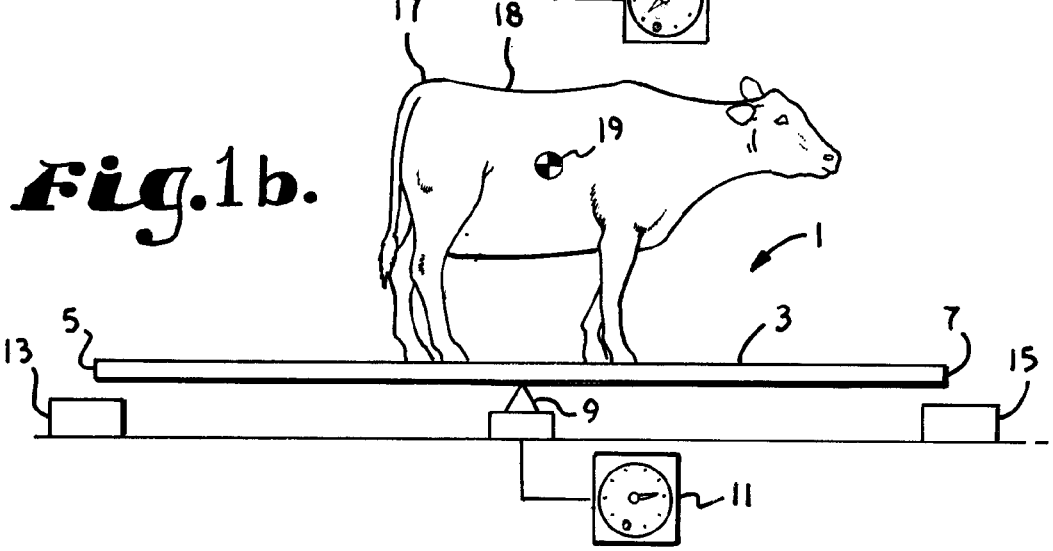
Figure 1C:
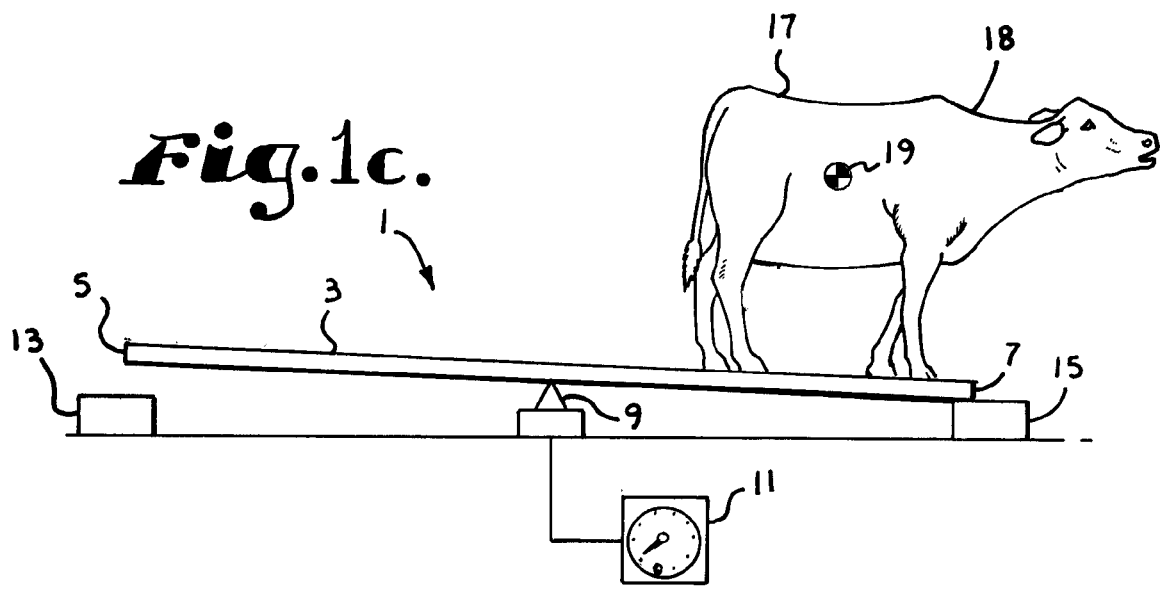

Referring to the drawings in more detail, FIGS. 1a–1c schematically depict a simple platform scale 1 which embodies the present invention. The scale 1 includes a platform 3 having an entrance end 5 and an exit end 7. Unlike the platforms of prior art scales, the platform 3 is supported so as to pivot or tip about a fulcrum or fulcrum member 9 which is operatively connected to a weighing device 11. A first limit stop 13 is provided under the entrance end 5 of the platform 3 so as to limit downward movement of the entrance end 5 as the platform 3 tips. Likewise, a second limit stop 15 is provided under the exit end 7 of the platform 3. The scale 1 is designed to measure the weight of a load 17, such as an animal 18, which moves across the platform 3 from the entrance end 5 toward the exit end 7. The load 17 may be either animate or inanimate and includes a center of gravity 19.

Referring to FIG. 1a, as the load 17 enters the platform 3 from the entrance end 5, its weight causes the entrance end 5 to pivot downwardly and to engage the first limit stop 13. At this point, the weight of the load 17 is supported in part by the first limit stop 13 and in part by the fulcrum 9. As the load 17 moves across the platform 3, more of its weight is gradually transferred to the fulcrum 9 and, consequently, to the weighing device 11. As the center of gravity 19 of the load 17 approaches the fulcrum 9, the entrance end 5 of the platform 3 begins to tip upwardly and off of the first limit stop 13, as shown in FIG. 1b. Once the entrance end 5 of the platform 3 has cleared the first limit stop 13, the entire weight of the load 17 is supported by the fulcrum 9, and the weighing device 11 will reflect the weight of the load 17 (once adjusted for the tare weight of the platform 3).

Referring to FIG. 1c, as the load 17 continues to move toward the exit end 7 of the platform 3, the exit end 7 tips downwardly until it engages the second limit stop 15. Once the exit end 7 engages the second limit stop 15, a portion of the weight of the load 17 will be transferred to the second limit stop 15 and the weighing device 11 will no longer accurately reflect the weight of the load 17. The distance traveled by the center of gravity 19 of the load 17 between the time the entrance end 5 of the platform 3 lifts off the first limit stop 13 and the time that the exit end 7 engages the second limit stop 15 defines a "weighing zone" in which the fulcrum 9 bears the entire weight of the load 17 such that the weight can be registered by the weighing device 11. The weight of the load 17 is then gradually transferred from the fulcrum 9 and weighing device 11 to the second limit stop 15 until the load 17 moves off the exit end 7 of the platform 3.

A major advantage of the scale 1 over prior art scales is that the weight of the load 17 is gradually transferred onto and off of the weighing device 11, drastically reducing any shock loads that could affect the accuracy of the device 11. Because the full weight of the load 17 is the highest weight to act on the weighing device 11, the weighing device 11 need only be equipped with means to record the highest weight registered, and this will be the accurate weight of the load 17. Means for recording the highest or peak load registered by the weighing device 11 are well known in the art.

Figure 2A:
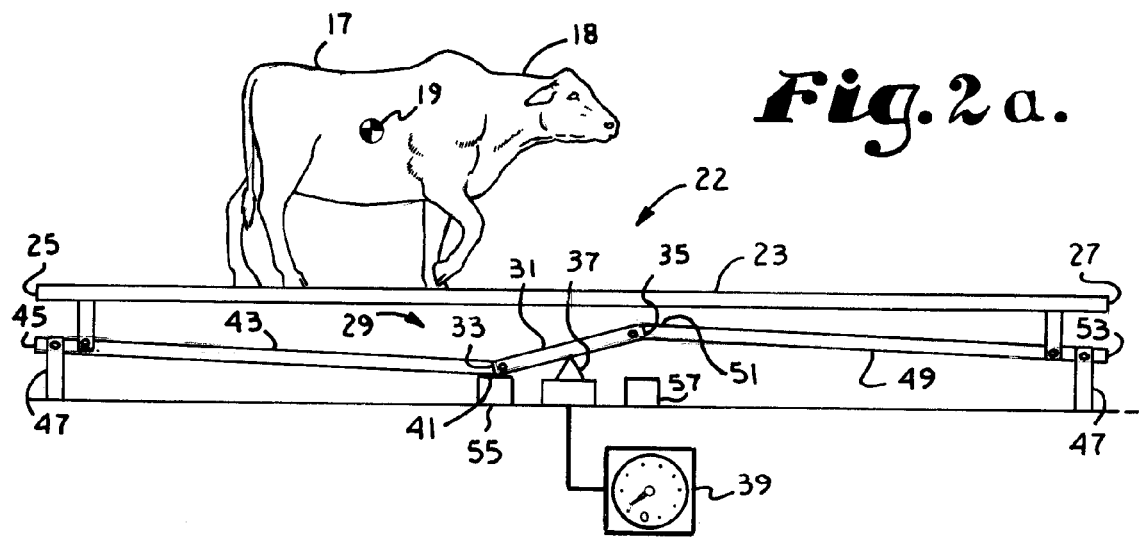
FIGS. 2a–2c are schematic representations of a scale disclosing the concept of a reduced motion version of the scale and showing the action of the scale as a load moves across the weighing platform.
Figure 2B:
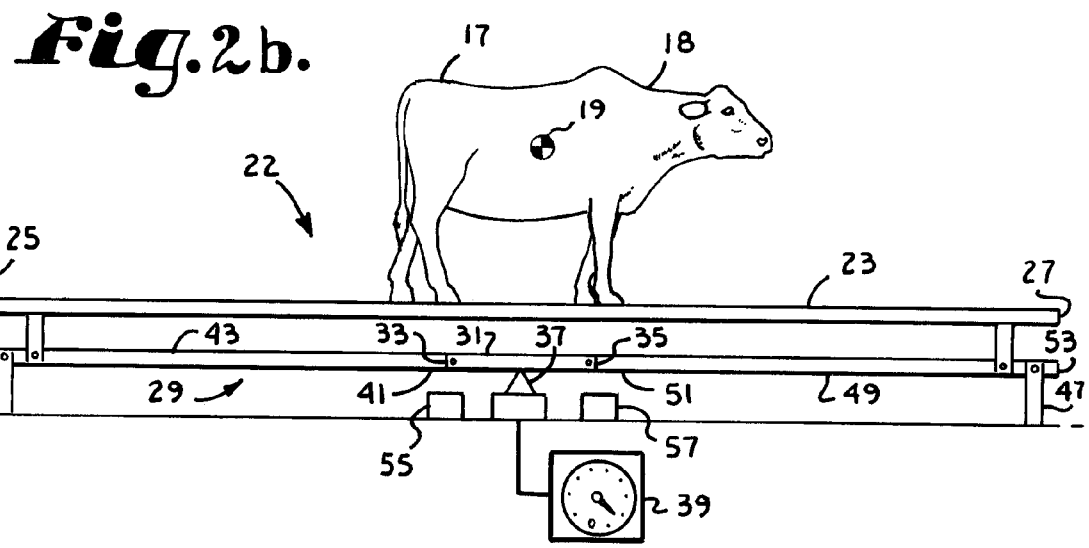
Figure 2C:
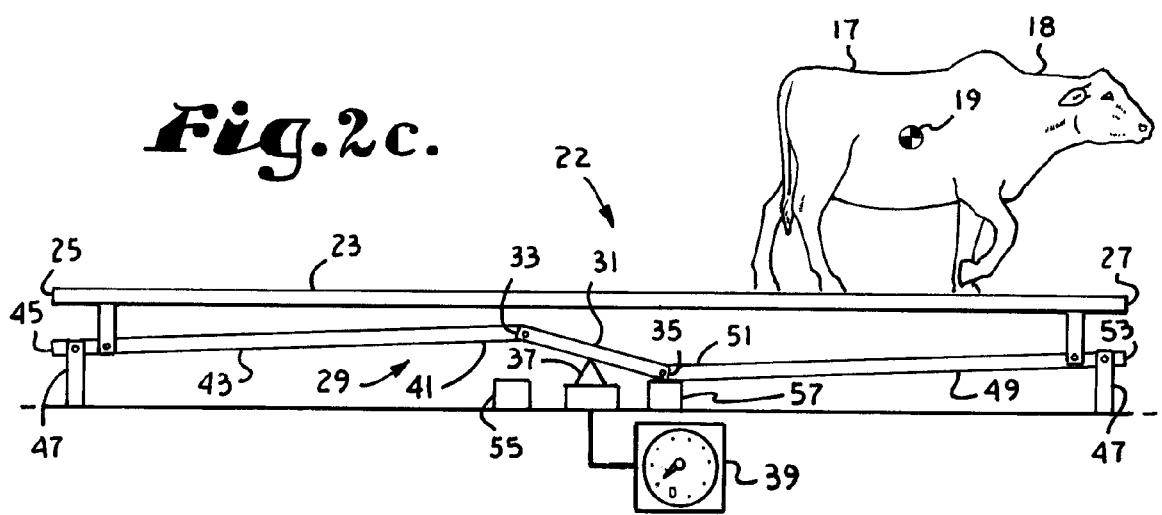

Scales having a platform which acts as a tipping balance member, such as the scale 1 described above, would work effectively in many applications (some of which will be discussed later herein). In other applications, however, significant movement of the platform could be disadvantageous. For example, in livestock scales, the tipping of the platform could startle the animals and make them hesitant to cross the platform. In these applications, the tipping action can be accomplished by a tipping balance member which is separate from the platform, thereby reducing the motion of the platform itself FIGS. 2a–2c schematically depict the concept of a reduced motion scale 22 having a platform 23 with an entrance end 25 and an exit end 27. Positioned beneath the platform 23 is a linkage 29 which includes a tipping balance member 31. The tipping balance member 31 has first and second ends 33 and 35 respectively, and is pivotally supported on a fulcrum 37 intermediate the first end 33 and second end 35. The fulcrum 37 is operatively connected to a weighing device 39. The first end 33 of the tipping balance member 31 is pivotally connected to a first end 41 of a first scale arm 43. The first arm 43 extends from the tipping balance member 31 toward the entrance end 25 of the platform 23, where a second end 45 thereof is pivotally supported on a frame or foundation 47. Similarly, a second scale arm 49 has a first end 51 which is pivotally connected to the second end 35 of the tipping balance member 31. The second arm 49 extends from the tipping balance member 31 toward the exit end 27 of the platform 23, where a second end 53 thereof is pivotally supported on the frame or foundation 47. A first limit stop 55 is positioned under the first end 33 of the tipping balance member 31 to limit downward movement thereof Similarly, a second limit stop 57 is positioned under the second end 35 of the tipping balance member 31.

The platform 23 is supported by the linkage 29. The entrance end 25 of the platform 23 is pivotally connected to the first arm 43 proximate its second end 45. The exit end of the platform 23 is pivotally connected to the second arm 49 proximate its second end 53.

Referring to FIG. 2a, as the load 17 (which is again depicted as an animal 18) enters the platform 23 from the entrance end 25, its weight pushes downwardly on the first scale arm 43 and causes the first end 41 thereof to pivot downwardly. Downward movement of the first end 41 of the first scale arm 43 causes the first end 33 of the tipping balance member 31 to also pivot downwardly and to engage the first limit stop 55 such that the limit stop 55 supports a portion of the weight of the load 17. As the load 17 moves across the platform 23, an increasing portion of its weight is gradually transferred to the second scale arm 49, and thereby to the second end 35 of the tipping balance member 31. As the center of gravity 19 of the load 17 approaches the fulcrum 37, the first end 33 of the tipping balance member 31 begins to tip upwardly and off of the first limit stop 55, as shown in FIG. 2b. Once the first end 33 of the tipping balance member 31 has cleared the first limit stop 55, the weight of the load 17 is supported in the center by the fulcrum 9 and at the ends by the frame 47. With the load 17 so positioned, the weight acting through the fulcrum 37 on the weighing device 39 will be a fixed percentage of the weight of the load 17 and the tare weight of the platform 23, which can easily be adjusted to reflect the actual weight of the load 17.

Referring to FIG. 2c, as the load 17 continues to move toward the exit end 27 of the platform 23, an increasing amount of its weight begins to push downwardly on the second scale arm 49, causing the first end 51 thereof to pivot downwardly. Downward movement of the first end 51 of the second scale arm 49 causes the second end 35 of the tipping balance member 31 to also pivot downwardly and to engage the second limit stop 57 such that the limit stop 57 supports a portion of the weight of the load 17. The weighing zone of the scale 22 within which the load 17 may be weighed is the defined by the distance traveled by the center of gravity 19 between the time the first end 33 of the tipping balance member 31 lifts off of the first limit stop 55 and the time that the second end 35 of the tipping balance member 31 contacts the second limit stop 57. The portion of the weight of the load 17 supported by fulcrum 37 and weighing device 39 gradually decreases as the load 17 moves off the exit end 27 of the platform 23.

As with the scale 1, the scale 22 has the advantage of gradually loading and unloading the weighing device 39 and thereby eliminating the transmission of shock loads thereto. In addition, the scale 22 operates with only minimal movement of the platform 23.

II. First Application

Figure 3:
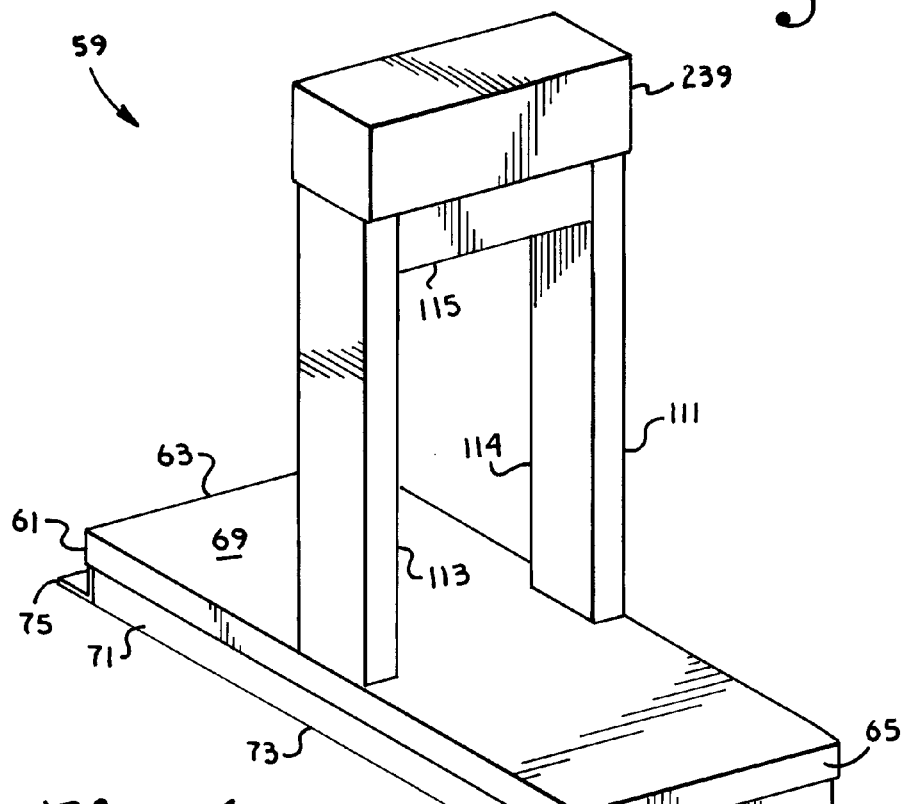
FIG. 3 is a perspective view of a livestock scale which is an application of the reduced motion concept of FIGS. 2a–2c.
Figure 4:
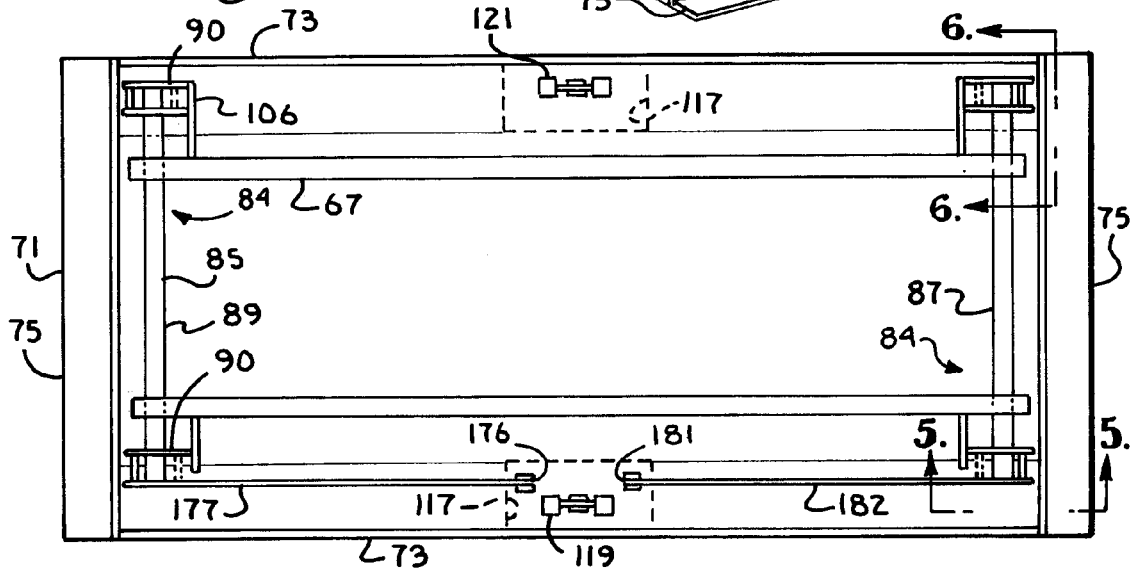
FIG. 4 is a top view of the weighing platform of the scale of FIG. 3 with the decking removed for clarity.

FIGS. 3–10 depict a livestock scale 59 which represents an application of the reduced motion concept previously described in conjunction with the scale 22. Referring to FIGS. 3 and 4, the scale 59 includes a platform 61 across which animals (not shown) to be weighed are moved. The platform 61 includes a first end 63 and a second end 65. For ease of explanation, the first end 63 will be designated as an "entrance" end, and the second end 65 will be designated as an "exit" end, however it is to be understood that the direction of movement of the animals is immaterial. The platform 61 generally comprises a pair of longitudinal support members 67, to which flooring or decking 69 is attached. The support members 67 may be formed of steel channel and the decking 69 may be wood, steel plate, or any other suitable material.

The platform 61 is moveably mounted on a frame 71 which generally comprises a boxlike structure having side rails 73 and end rails 75. The side rails 73 are shown as being formed of steel angle stock having a vertical flange 77 and an inwardly pointed horizontal flange 79 (see FIG. 6). The end rails 75 are similarly formed of steel angle stock having a vertical flange 81 and an outwardly oriented horizontal flange 82 (see FIG. 5). A floor plate 83 is fastened to the horizontal flanges 79 and 82 to enclose the underside of the platform 61.

Referring to FIG. 4, The platform 61 is mounted on the frame 71 through a scale mechanism 84 which includes first and second rocker shafts 85 and 87, respectively, which allow the platform 61 to pivot relative to the frame 71. The first rocker shaft 85 is positioned transversely to the frame side rails 73 proximate the entrance end 63 of the platform 61. Similarly, the second rocker shaft 87 is positioned transversely to the side rails 73 proximate the exit end 65 of the platform 61. Each of the rocker shafts 85 and 87 comprises an elongate cylindrical body 89 having pairs of parallel, spaced apart pivot plates 90 connected thereto proximate each end. The pivot plates 90 each extend inwardly and outwardly from the body 89 to inner ends 91 and outer ends 92, respectively. The ends 91 and 92 are rounded so as to have a uniform radius relative to the center of the cylindrical body 89 (see FIG. 5).

Figure 5:
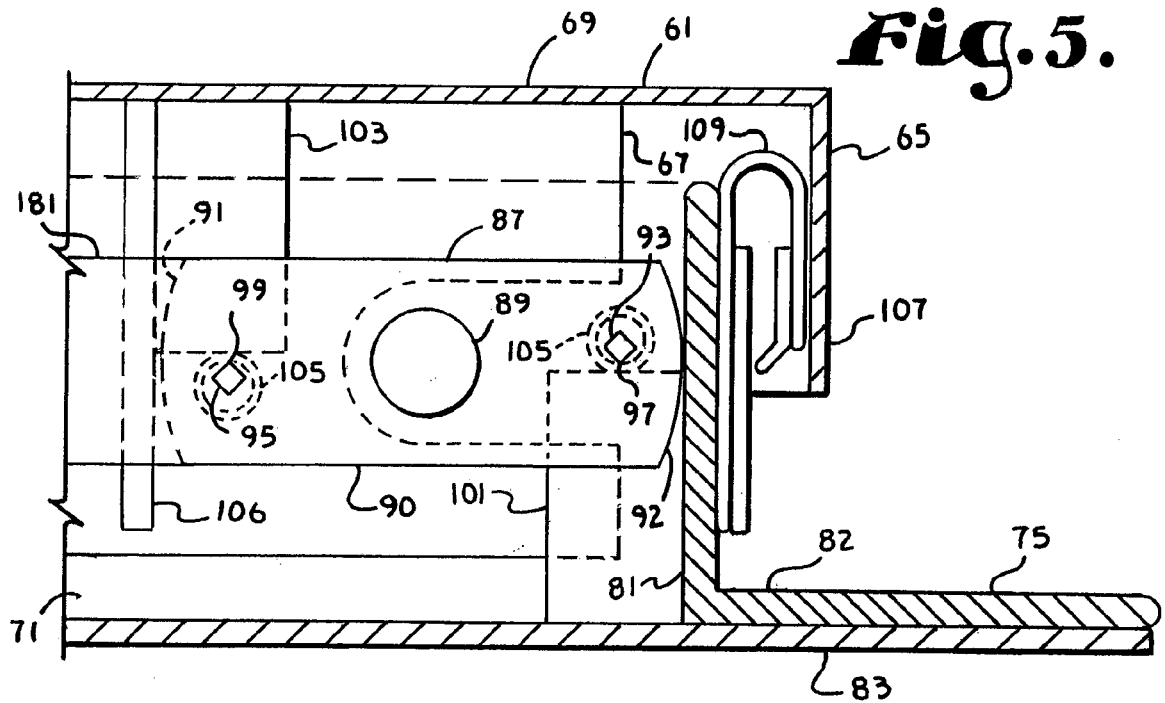
FIG. 5 is a fragmentary cross-sectional view of the scale pivots taken generally along line 5—5 in FIG. 4.
Figure 6:
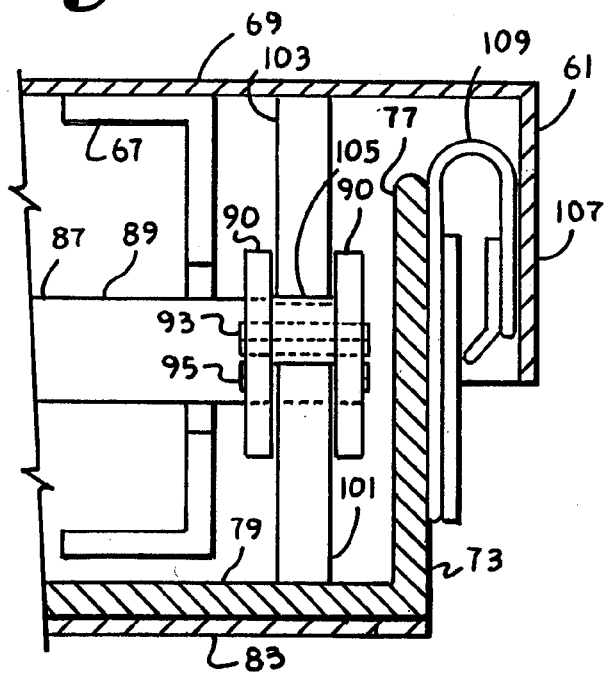
FIG. 6 is a fragmentary cross-sectional view of the scale pivots taken generally along line 6—6 in FIG. 4.

Referring to FIGS. 5 and 6, extending between each pair of pivot plates 90 are first and second scale pivots 93 and 95, respectively. Each of the scale pivots 93 and 95 is formed of hardened steel bar having a generally square cross section. The first scale pivots 93 are oriented such that one corner thereof forms a downwardly pointing knife edge 97. Similarly, the second scale pivots 95 are oriented such that one corner thereof forms an upwardly pointing knife edge 99. The scale pivots 93 and 95 are removably mounted to the pivot plates 90 so as to be easily replaceable, and while removed can be rotated and reinserted such that an unused corner can be moved into the knife edge position to replace a worn knife edge.

Each of the downwardly pointing knife edges 97 of the first scale pivots 93 bears against a lower bearing block 101 fixedly attached to the frame 71. Similarly, each of the upwardly pointing knife edges 99 of the second scale pivots 95 bears against an upper bearing block 103 fixedly attached to the platform 61. Optionally, hardened bushings 105 can be placed around the scale pivots 93 and 95 so as to be interposed between the knife edges 97 and 99 and their respective bearing blocks 101 and 103. The bushings 105 act to protect the softer bearing blocks 101 and 103 from being excessively worn by the knife edges 97 and 99.

In order to keep the rocker shafts 85 and 87 from sliding out of position, the rounded outer ends 92 of the pivot plates 90 are positioned in close proximity to the inner surface of the vertical end rail flanges 81 such that the flanges 81 serve to limit movement of the shafts 85 and 87 in an outward direction. Lateral walls 106 connected to the platform 61 proximate the inner ends 91 of the pivot plates 90 limit movement of the shafts 85 and 87 in an inward direction. The rounded shape of the ends 91 and 92 allows the shafts 85 and 87 to pivot without interference from the walls 106 or flanges 81.

The platform 61 further includes an edge flange 107 which projects downwardly from the platform decking 69 around the outer perimeter thereof The edge flange 107 overlaps respective upper portions of the frame side rail vertical flanges 77 and end rail vertical flanges 81. Interposed between the platform edge flange 107 and the frame flanges 77 and 81 is a continuous flexible seal 109 which prevents debris and moisture from entering the scale mechanism 84 and interfering with its operation.

As best seen in FIG. 3, midway along the length of the platform 61 is a bridge housing 111 which includes first and second vertical legs 113 and 114, and a cross channel 115. The housing legs 113 and 114 each comprise a tube or conduit of generally rectangular cross section which are fastened to the platform 61 proximate the side edges thereof The platform 61 includes openings 117 beneath the legs 113 and 114 such that the interior of the legs can communicate with the space beneath the platform 61 (see FIG. 4). The housing cross channel 115 is also of a generally rectangular cross section and is open on its top side. The cross channel 115 is fastened to the legs 113 and 114 at its opposed ends such that its interior communicates with the interior of the legs 113 and 114. Since the bridge housing 111 is connected to the platform 61, its weight becomes part of the tare weight of the scale 59.

As seen in FIGS. 7–10, positioned inside of the bridge housing 111 is a flexible bridge frame structure 118 which includes first and second vertical frame members 119 and 121 positioned inside of the respective first and second housing legs 113 and 114. The vertical frame members 119 and 121 extend through the openings 117 in the platform 61 and are pivotally attached to the frame 71 at their lower ends. The vertical members 119 and 121 are each shown as comprising two lengths of square tubing 123 connected at their lower ends by a plate 125 (see FIGS. 7 and 10). Each plate 125 includes a downwardly facing notch 127. A pair of clevis plates 129 extend upwardly from each side rail horizontal flange 79 below the respective opening 117. A pin 131 extends between each pair of the clevis plates 129. The notches 127 each engage the respective pin 131 so as to allow the respective frame member 119 or 121 to rock both laterally and fore-and-aft relative to the frame 71.

Figure 8:
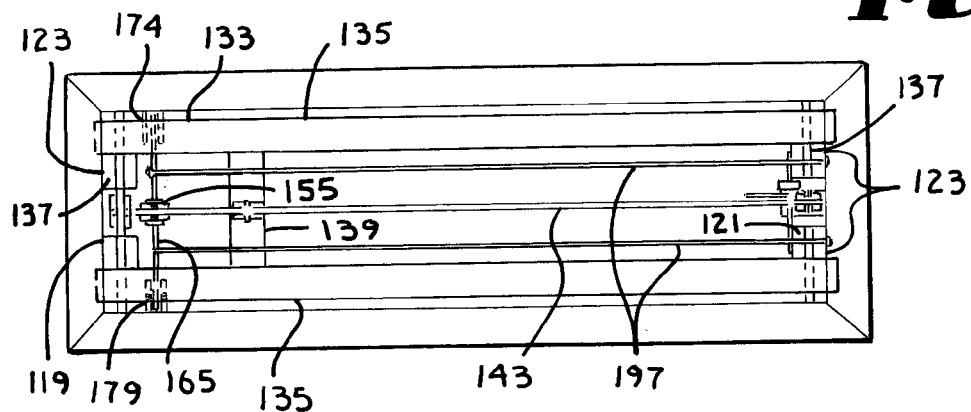
FIG. 8 is a top view of the bridge of the scale of FIG. 3 with portions removed to show the details of the scale mechanism.
Figure 9:
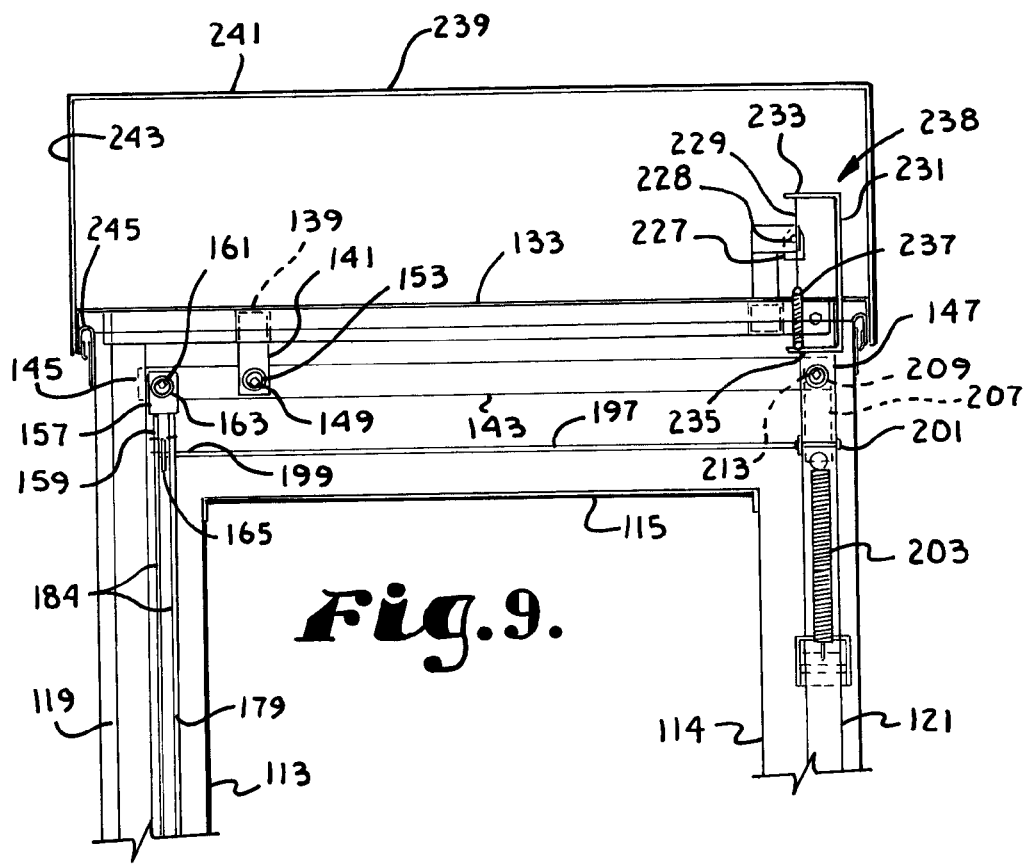
FIG. 9 is a fragmentary end view of the scale of FIG. 3 with portions removed to show the details of the scale mechanism.

As seen in FIGS. 8 and 9, a generally horizontal upper frame member 133 is positioned within the housing cross channel 115 and connects the vertical frame members 119 and 121. The upper frame member 133 is shown as comprising two lengths of square tubing 135 pivotally connected to the frame members 119 and 121 by pins or bolts 137. A cross piece 139 is welded between the lengths of tubing 135 at a point which is intermediate the connection with the first vertical frame member 119 and the midpoint of the upper frame member 133. Extending downwardly from the cross piece 139 are a pair of clevis plates 141 to which a weigh beam 143 is connected.

The weigh beam 143 is positioned within the housing cross channel 115 below the upper frame member 133. The weigh beam 143 has a first end 145 proximate the first vertical frame member 119 and a second end 147 proximate the second vertical frame member 121. The connection between the weigh beam 143 and the clevis plates 141 is preferably made by a hardened pivot pin 149 which extends through the weigh beam 143. The pivot pin 149 has a downwardly oriented knife edge which engages hardened bushings 153 connected to the clevis plates 141. The pivot pin 149 and all similar pivot pins to be discussed herein may be square pins having interchangeable knife edges as previously described in reference to the scale pivots 93 and 95.

Figure 7:
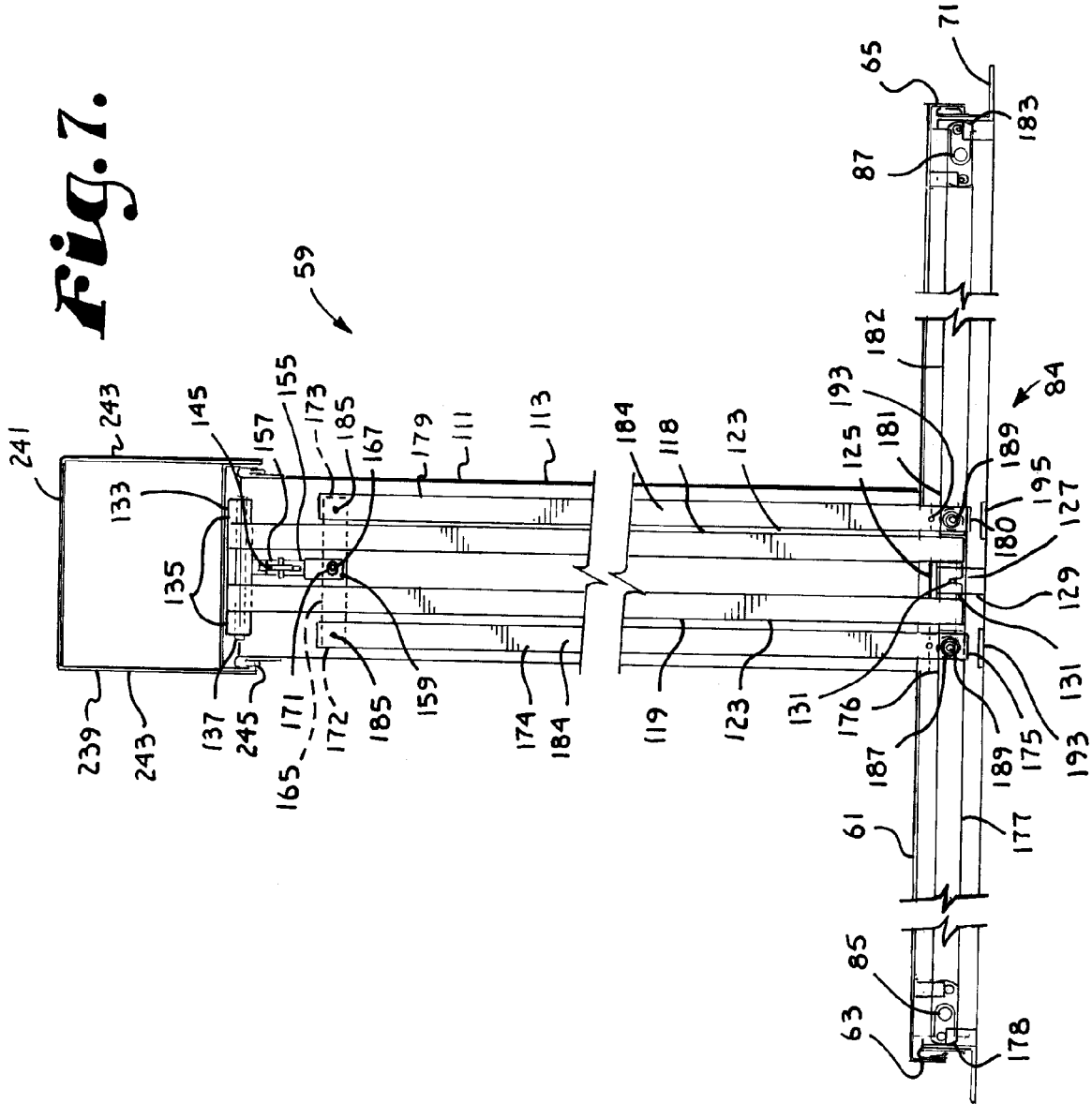
FIG. 7 is a fragmentary left side view of the scale of FIG. 3 with portions removed to show the details of the scale mechanism.

As best seen in FIGS. 7 and 9, attached to the first end 145 of the of the weigh beam 143 and extending downwardly therefrom is a double clevis 155 having a pair of upper clevis plates 157 and a pair of lower clevis plates 159. The lower clevis plates 159 are rotated ninety degrees relative to the upper clevis plates 157. As best seen in FIG. 9, the upper clevis plates 157 pivotally engage a pivot pin 161 which extends through the weigh beam 143. The pivot pin 161 has a upwardly oriented knife edge which engages hardened bushings 163 connected to the clevis plates 157. Pivotally supported by the lower clevis plates 159 is a tipping balance member 165 (see FIG. 7). The connection between the lower clevis plates 159 and the tipping balance member 165 is made by a pivot pin 167 which extends through the tipping balance member 165. The pivot pin 167 serves as a fulcrum about which the tipping balance member 165 pivots. The pivot pin 167 has a downwardly oriented knife edge which engages hardened bushings 171 connected to the clevis plates 159.

The tipping balance member 165 has a first end 172 and a second end 173 which are equally spaced outward from the fulcrum pin 167. Pivotally attached to the first end 172 of the tipping balance member 165 is a first vertical link 174 which extends downwardly from the tipping balance member 165, through the first leg 113 of the bridge housing 111, and through the opening 117 in the platform 61. A lower end 175 of the first vertical link 174 is pivotally connected to a first end 176 of first scale arm 177. The first scale arm 177 extends beneath the platform 61 to a second end 178 thereof which is fixedly connected to the first rocker shaft 85. Similarly, a second vertical link 179 is pivotally attached to the second end 173 of the tipping balance member 165. The second vertical link 179 extends downwardly from the tipping balance member 165 to a lower end 180 which is pivotally connected to a first end 181 of a second scale arm 182. The second scale arm 182 extends beneath the platform 61 to a second end 183 thereof which is fixedly connected to the second rocker shaft 87. It should be noted that the scale arms 177 and 182 may comprise extensions of respective ones of the pivot plates 90 as shown in FIGS. 5 and 7, or they may be separate and distinct members.

The links 174 and 179 are shown in FIGS. 8 and 9 as comprising respective pairs of flat steel straps 184 positioned on each side of the tipping balance member 165. The straps 184 are pivotally connected to the tipping balance member 165 by pins 185 (see FIG. 7). The pins 185 are not shown as having knife edges, however knife edges could be used in order to decrease friction at the joints. Referring to FIG. 7, the lower ends of the straps 184 incorporate hardened bushings 187 which pivotally engage pivot pins 189 having downwardly facing knife edges which extend through the respective scale arms 177 and 182. The straps 184 making up each link 174 or 179 may be interconnected by one or more bolts or pins 193. The tipping balance member 165, vertical links 174 and 179, and the scale arms 177 and 182 all comprise parts of the scale mechanism 84.

Positioned beneath the lower end 175 of the first vertical link 174 on the horizontal flange 79 of the respective frame side rail 73 is a pad of resilient material 193 which serves as a first limit stop for the tipping balance member 165. Similarly, a second pad of resilient material 195 is positioned beneath the lower end 180 of the second vertical link 179 which serves as a second limit stop for the tipping balance member 165. The resilient nature of the pads 193 and 195 serves to reduce noise that would be created if the lower ends 175 and 180 of the links 174 and 179 were to impact a hard surface.

In order to make it possible for an accurate tare weight can be established for the scale 59, it is important that the tipping balance member 165 not rest on either of the limit stops 193 and 195 under no-load conditions. The tipping balance member 165 is urged into a horizontal position when there is no load on the platform 61 by a pair of thin torsion bars 197, as seen in FIGS. 8 and 9. The torsion bars 197 each have a first end 199 which is fixedly attached to the tipping balance member 165. From the first ends 199, the torsion bars 197 extend across the platform 61, through the housing cross channel 115, to a second end 201 which is fixedly attached to the second vertical frame member 121. The bars 197 are of a sufficiently thin diameter that they can flex and provide very little resistance as the weigh beam 143 pivots about the pin 149. The torsional resilience of bars 197, however, is sufficient to move the tipping balance member 165 and the platform 61 into a horizontal position under no-load conditions so that an accurate tare weight can be established.

While dual torsion bars 197 are shown herein, it is to be understood that other means can be used to level the tipping balance member 165 under no load conditions. For example, a single torsion bar 197 could be made integral with the fulcrum pin 167 to achieve the same purpose. Alternatively, a first end of a flat spring (not shown) could be fixedly connected to the tipping balance member 165. A second end of the flat spring and the fulcrum pin 167 would then be pivotally connected to the first vertical frame member 119 through a pair of parallel links (not shown). As with the torsion bars 197 depicted, this arrangement which would allow vertical movement of the first end 145 of the weigh beam 143 while urging the tipping balance member 165 into a horizontal orientation under no load conditions. In yet another embodiment, the tipping balance member 165 could be made generally T-shaped by adding a leg (not shown) extending upwardly or downwardly perpendicular to the tipping balance member 165. Extension springs (not shown) could then be connected between the leg and the first vertical frame member 119 to provide the recommended bias.

Referring to FIGS. 9 and 10, attached to weigh beam 143 proximate the second end 147 is a scale spring 203 which pulls downwardly on the second end 147 to counter the downward forces acting on the first end 145 of the weigh beam 143. An upper end 205 of the scale spring 203 is connected to the weigh beam 143 by a pair of clevis plates 207. The clevis plates 207 include hardened bushings 209 which pivotally engage an upwardly facing knife edge of a pivot pin 213 extending through the weigh beam 143 proximate the second end 147. A pin 215 extends between the clevis plates 207 and accepts the upper end 205 of the spring 203. A lower end 217 of the spring 203 is connected to a first end 219 of a bracket 221 which is pivotally mounted to the second vertical frame member 121. A tare adjustment bolt 223 is connected between a second end 225 of the bracket 221 and the upper frame member 133. By turning the tare adjustment bolt 223, more or less tension can be put on the scale spring 203, and the scale 59 can thereby be zeroed.

Fixedly mounted on the upper frame member 133 proximate the second end 147 of the weigh beam 143 is a rotary encoder 227 having a rotatable shaft 228. The shaft 228 engages a flexible fiber 229 which is attached to the weigh beam 143 by a C-shaped bracket 231 having an upper leg 233 and a lower leg 235. The fiber 229 is connected between the upper leg 233 and the lower leg 235 of the bracket 231 and tensioned by a spring 237. The lower leg 235 is welded to an upper end of the clevis plates 207 such that the bracket 231 moves up and down with the second end 147 of the weigh beam 143 but the fiber 229 remains in a generally vertical orientation. The fiber 229 is looped around the shaft 228 such that the fiber 229 turns the shaft 228 as the second end 147 of the weigh beam 143 moves upwardly in response to a load on the platform 61. The encoder 227 produces a signal, such as an electrical or optical signal, representative of the number of turns or partial turns of the shaft and sends the signal to a computer or counter (not shown). Since the encoder signal is proportional to the displacement of the second end 147 of the weigh beam 143, and therefore to the weight of a load on the platform 61, the computer or counter can determine the weight of the load based upon the encoder signal.

It should be noted that the weigh beam 143, scale spring 203, encoder 227 and fiber 229 together comprise a weighing device 238 which is described by way of example only, and that various other known weighing devices could be incorporated into the scale 59 in place of the structure described. For example, a load cell (not shown) could be mounted between the clevis 155 and the upper frame member 133, eliminating the need for the weigh beam 143 entirely. Alternatively, the load cell could be mounted at the second end 147 of the weigh beam 143 in place of the encoder 227 and fiber 229. Mechanical devices could also be used to read the weight on the scale platform 61. For example, the second end 147 of the weigh beam 143 could be provided with a needle to point to a weight reading on a graduated scale. A floating marker or "tattle-tale" could be provided to mark the highest level on the scale reached by the needle.

The upper side of the bridge housing 111 is covered by an enclosure 239 which is generally in the form of an inverted box having a top wall 241 and side walls 243. The enclosure 239 is secured to the upper frame member 133 of the flexible bridge frame 118 such that the side walls 243 overlap an upper portion of the housing 111. A continuous elastomeric seal 245 is positioned between the housing 111 and enclosure side walls 243 to prevent debris or moisture from entering the enclosure 239 while allowing relative movement between the bridge housing 111 and the bridge frame 118.

In use, the scale 59 operates on the same principle as the scale 22 previously described. As an animal (not shown) enters the platform 61 from the entrance end 63, its weight initially pushes downwardly on the second scale pivots 95 of the first rocker shaft 85, causing the first end 176 of the first scale arm 177 to pivot downwardly about the respective first scale pivots 93. Downward movement of the first end 176 of the first scale arm 177 pulls downwardly on the first vertical link 174, causing the first end 172 of the tipping balance member 165 to also pivot downwardly. When the first end 172 of the tipping balance member 165 pivots downwardly, the lower end 175 of the first vertical link 174 engages the first limit stop 193 such that the limit stop 193 supports a portion of the weight of the animal.

As the animal moves across the platform 61, an increasing portion of its weight is gradually transferred to the second scale pivots 95 of the second rocker shaft 87. As the animal's center of gravity approaches the plane of the fulcrum pin 167, the portion of its weight acting downwardly on the second scale pivot 95 of the second rocker shaft 87 becomes sufficient to cause the second scale arm 182 to begin to pivot downwardly about its respective first scale pivots 93. As the first end 181 of the second scale arm 182 moves downwardly, the second end 173 of the tipping balance member 165 is also pulled downwardly by the second link 179. Simultaneously, the first end 172 of the tipping balance member 165 moves upwardly, lifting the lower end 175 of the first link 174 off of the first limit stop 193.

Once the lower end 175 of the first link 174 has cleared the first limit stop 193, the weight of the animal is supported by the fulcrum pin 167 and by the lower bearing blocks 101 which support the first scale pivots 93. With the animal so positioned, the weight acting through the fulcrum pin 167 on the weigh beam 143 will be a fixed percentage of the weight of the animal (plus the tare weight of the platform 61). The percentage of the weight acting on the weigh beam 143 is based upon the distance between respective pairs of the first scale pivots 93 and second scale pivots 95, and the distance between the first scale pivots 93 and the pivot pins 189.

The force acting downwardly on the fulcrum pin 167 will pivot the first end 145 of the weigh beam 143 downwardly about the pin 149, causing the second end 147 to move upwardly against the bias of the scale spring 203. As the second end 147 moves upwardly, the fiber 229 turns the shaft 228 of the encoder 227, generating a signal from which the weight of the animal can be determined by the computer or counter.

As the animal continues to move toward the exit end 65 of the platform 61, an increasing amount of its weight pushes downwardly on the second scale arm 182, causing the first end 181 thereof to continue pivoting downwardly until the lower end 180 of the second vertical link 179 engages the second limit stop 195. The portion of the animal's weight supported by fulcrum pin 167 and weighing device 238 gradually decreases until the animal moves off the exit end 65 of the platform 61. After the animal leaves the platform 61, the torsion bars 197 urge the tipping balance member 165 back into a generally horizontal position. This prevents the tipping balance member 165 from resting on either of the stops 193 or 195 while the tare weight of the scale 59 is determined and adjusted for.

III Other Applications

FIGS. 11–13 schematically depict other applications in which the concept of the tipping balance scale 1 generally described above may be utilized. FIG. 11 depicts a scale 300 for weighing a wheeled load. The scale 300 could be mounted, for example, in a roadbed for weighing vehicles or in a conveyor rail for weighing loads supported from a wheeled conveyor trolley. The scale 300 includes a platform 301 having an entrance end 303 and an exit end 305. The platform 301 is pivotally mounted for rotation about a fulcrum 307 which has a weighing device (not shown) operatively connected thereto. Respective first and second limit stops 311 and 313 are provided for limiting downward movement of the entrance end 303 and exit end 305 of the platform 301. The platform 301 is traversed from the entrance end 303 to the exit end 305 by a wheel 306 supporting a load (not shown). In conveyor applications, the platform 301 could comprise a section of rail.

The platform 301 may be upwardly curved at the ends 303 and 305 so as to provide a smoother transition for the wheel 306 and thereby further decrease shock loading of the weighing device. The curved platform 301 allows the wheel 306 to remain at a constant level throughout its traverse of the platform 301. In tandem axle applications, the length of the platform 301 may be selected so as to allow it to return to a neutral position between the passage of successive wheels.

In use, the weight of the load acting downwardly through the wheel 306 initially pushes downwardly on the entrance end 303 of the platform 301 and thereby pivots the entrance end 303 against the first limit stop 311 such that a portion of the weight bears against the first limit stop 311. As the wheel 306 continues toward the exit end 305 of the platform 301 and approaches the fulcrum 307, the weight of the load is gradually shifted to the fulcrum 307 until the platform 301 pivots off of the first limit stop 311. The weight of the load acting through the wheel 306 may then be measured by the weighing device. As the wheel 306 moves past the fulcrum 307, a sufficient portion of the weight is shifted to the exit end 305 to move the exit end 305 downwardly against the second limit stop 313 such that a portion of the weight bears against the second limit stop 313. The weight of the load is then gradually shifted from the fulcrum 307 to the second limit stop 313 until the wheel 306 exits the platform 301.

FIG. 12 depicts a conveyor scale 400 for use in conjunction with a belt type conveyor line 401. The scale 400 includes a platform 402 having an entrance end 403 and an exit end 405. The platform 402 is equipped with a continuous conveyor belt 407 entrained around rollers 409 and driven by a power source 411. The platform 402 is pivotally mounted for rotation about a fulcrum 413 which has a weighing device (not shown) operatively connected thereto. Respective first and second limit stops 417 and 419 are provided for limiting downward movement of the entrance end 403 and exit end 405 of the platform 402.

In use, successive loads, such as packages or containers 421 are placed on the platform 402 at the entrance end 403 and carried by the conveyor belt 407 toward the exit end 405. The weight of a load 421 initially pushes downwardly on the entrance end 403 of the platform 402 and thereby pivots the entrance end 403 against the first limit stop 417 such that a portion of the weight bears against the first limit stop 417. As the load continues toward the exit end 405 of the platform 402 and approaches the fulcrum 413, the weight of the load 421 is gradually shifted to the fulcrum 413 until the platform 402 pivots off of the first limit stop 417. While the platform 402 is positioned such that no part of the load 421 is supported by the limit stops 417 and 419, the weight of the load 421 may be measured by the weighing device. As the load 421 moves past the fulcrum 413, a sufficient portion of the weight is shifted to the exit end 405 to move the exit end 405 downwardly against the second limit stop 419 such that a portion of the weight bears against the second limit stop 419. The weight of the load 421 is then gradually shifted from the fulcrum 413 to the second limit stop 419 until the load 421 exits the platform 402.

FIG. 13 depicts a rotary scale 500 which may be utilized for weighing granular material 501. The scale 500 includes a fixed circular ring 502 of track 503 about which a plurality of double bucket assemblies 505 rotate on a hub 507. Each double bucket assembly 505 includes a pair of buckets 509 connected by links 511 such that the buckets 509 are positioned on opposite sides of the ring 502 from one another. Each bucket 509 has associated therewith a roller 513 which rides along the outside of the ring 503. Each link 511 is also mounted on rollers 515 which slidably engage radial tracks 517 extending outwardly from the hub 507.

A portion of the track 503 mounted at the top end thereof is separated from the remainder of the ring 503 and pivotally mounted to pivot about a fulcrum 519 and act as a weighing platform and tipping balance member 521. A weighing device (not shown) is operatively connected to the fulcrum 519. The tipping weighing platform 521 has an entrance end 525 and an exit end 527. A first limit stop 529 is positioned under the entrance end 525 to limit downward movement of the entrance end 525. A second limit stop 531 is positioned under the exit end 527 to limit downward movement of the exit end 527.

Granular material 501 is loaded into successive buckets 509 through a chute 533 located at an upper position on the scale 500. The weight of the material 501 causes the hub 507 and attached double bucket assemblies 505 to rotate. As each loaded bucket 509 approaches the bottom of the ring 502, the roller 513 of the opposite bucket 509 comes onto the weighing platform 521, at which point the weight of the loaded bucket pulls the respective double bucket assembly 505 downward along the respective radial track 517 and pivots the entrance end 525 of the weighing platform 521 against the first limit stop 525. As the hub 507 continues to rotate, the roller 513 moves toward the fulcrum 519, gradually shifting the weight of the loaded bucket 509 from the first limit stop 529 to the fulcrum 519 and attached weighing device. When the entrance end 525 lifts off of the first limit stop 529, the weighing device can measure the weight of the loaded bucket 509.

After the weight is measured, the roller 513 continues to move along the weighing platform 521. As the roller 513 moves past the fulcrum 519, the exit end 527 of the weighing platform 521 pivots downwardly and against the second limit stop 531. The weight of the loaded bucket 509 is then gradually transferred from the fulcrum 519 to the second limit stop 531 until the roller 513 moves off of the platform 521. After the loaded bucket 509 is weighed, it begins to move upwardly along the ring 502 and is inverted such that the material 501 is dumped out.

It is to be understood that while certain forms of the present invention have been illustrated and described herein, it is not to be limited to the specific forms or arrangement of parts described and shown.

What is claimed and desired to be secured by Letters Patent is as follows:

1. A scale for weighing moving loads, comprising:
   a) a weighing platform having an entrance end and an exit end;
   b) a tipping balance member having a first end and a second end, said tipping balance member being mounted for pivoting about a fulcrum between said first and second ends, said tipping balance member connected to said weighing platform such that downward movement of said platform entrance end causes said tipping balance member to pivot in a first direction and downward movement of said platform exit end causes said tipping balance member to pivot in a second direction opposite said first direction;
   c) a weighing device operatively connected to said fulcrum so as to measure weight acting on said fulcrum;
   d) a first limit stop limiting movement of said tipping balance member in said first direction; and
   e) a second limit stop limiting movement of said tipping balance member in said second direction; wherein
   f) the weight of a load entering said platform from said entrance end and moving toward said exit end initially pushes downwardly on said entrance end and thereby pivots said tipping balance member in said first direction and against said first limit stop such that a portion of the weight bears against said first limit stop;
   g) as the load continues toward said exit end of said platform the load enters a weighing zone wherein the weight is distributed between said entrance and exit ends such that said tipping balance member pivots in said second direction and off of said first limit stop such that the weight is measurable by said weighing device; and
   h) as the load moves out of said weighing zone, a sufficient portion of the weight is shifted to said exit end of said platform to move said exit end downwardly and thereby pivot said tipping balance member in said second direction and against said second limit stop such that a portion of the weight bears against said second limit stop.

2. The scale as in claim 1 wherein said platform comprises said tipping balance member.

3. The scale as in claim 1 wherein said tipping balance member is integral to said platform.

4. The scale as in claim 1 wherein said weighing platform is moveably mounted on a frame, said platform being connected to said frame and to said tipping balance member through first and second scale arms, said first scale arm having a first end and a second end, said first end pivotally connected to said tipping balance member first end, said second end pivotally connected to said frame proximate said platform entrance end, said platform entrance end being supported on said first scale arm between said first scale arm first and second ends; said second scale arm having a first end and a second end, said first end pivotally connected to said tipping balance member second end, said second end pivotally connected to said frame proximate said platform exit end, said platform exit end being supported on said second scale arm between said second scale arm first and second ends.

5. The scale as in claim 4 and further including means for urging said tipping balance member into a neutral position under no load conditions, in said neutral position said tipping balance member not engaging either of said first and second limit stops.

6. The scale as in claim 4 wherein said first and second scale arms are positioned beneath said platform.

7. The scale as in claim 6 wherein said tipping balance member is connected directly to said first and second scale arms.

8. The scale as in claim 4 wherein said tipping balance member is positioned above said platform and connected to said first scale arm and said second scale arm by respective first and second links.

9. The scale as in claim 8 and further including a bridge structure spanning said platform and connected to said frame, wherein:
   a) said weighing device includes a weigh beam having first and second ends, said weigh beam pivotally connected to said bridge structure between said first and second ends; and
   b) said fulcrum is connected to said weigh beam first end such that downward movement of said fulcrum causes proportional upward movement of said weigh beam second end.

10. The scale as in claim 9 wherein said weighing device further includes a scale spring biasing said second end of said weigh beam downwardly.

11. The scale as in claim 10 wherein said weighing device further includes:
    a) a flexible fiber connected to said weigh beam second end; and
    b) a rotary encoder connected to said bridge structure, said encoder having a shaft which engages said flexible fiber such that upward movement of said weigh beam causes rotation of said shaft, rotation of said shaft producing a signal from which the weight acting on said fulcrum can be determined.

12. The scale as in claim 11 and further including means for urging said tipping balance member into a neutral position under no load conditions, in said neutral position said tipping balance member not engaging either of said first and second limit stops.

13. A scale for weighing moving objects, comprising:
    a) a frame;
    b) a platform having an entrance end, an exit end, and a midpoint between said entrance and exit ends;
    c) a tipping balance member having a first end and a second end, said tipping balance member being mounted for pivoting about a fulcrum between said first and second ends, said fulcrum located proximate said platform midpoint;
    d) a weighing device operatively connected to said fulcrum so as to measure weight acting on said fulcrum;
    e) a first limit stop limiting downward movement of said tipping balance member first end;
    f) a second limit stop limiting downward movement of said tipping balance member second end;
    g) a first scale arm having a first end and a second end, said first end pivotally connected to said tipping balance member first end, said second end pivotally connected to said frame proximate said platform entrance end, said platform entrance end being supported on said first scale arm between said first scale arm first and second ends; and
    h) a second scale arm having a first end and a second end, said first end pivotally connected to said tipping balance member second end, said second end pivotally connected to said frame proximate said platform exit end, said platform exit end being supported on said second scale arm between said second scale arm first and second ends; wherein i) the weight of a load entering said platform from said entrance end and moving toward said exit end initially pushes downwardly on said entrance end and thereby pivots said first scale arm first end and said tipping balance member first end downwardly until further downward movement is prevented by said first limit stop and a portion of the weight bears against said first limit stop;

j) as the load approaches said fulcrum, the weight becomes distributed between said entrance and exit ends such that said tipping balance member first end pivots upwardly, unloading said first limit stop such that the weight is measurable by said weighing device; and k) as the load moves past said fulcrum a sufficient portion of the weight is shifted to said exit end of said platform to move said exit end downwardly and thereby pivots said second scale arm first end and said tipping balance member second end downwardly until further downward movement is prevented by said first limit stop and a portion of the weight bears against said first limit stop.

14. The scale as in claim 13 wherein said first and second scale arms are positioned beneath said platform.

15. The scale as in claim 14 wherein said tipping balance member is connected directly to said first and second scale arms.

16. The scale as in claim 13 wherein said tipping balance member is positioned above said platform and connected to said first scale arm and said second scale arm by respective first and second links.

17. The scale as in claim 16 and further including a bridge structure spanning said platform and connected to said frame, wherein:

a) said weighing device includes a weigh beam having first and second ends, said weigh beam pivotally connected to said bridge structure between said first and second ends; and b) said fulcrum is connected to said weigh beam first end such that downward movement of said fulcrum causes proportional upward movement of said weigh beam second end.

18. The scale as in claim 17 wherein said weighing device further includes a scale spring biasing said second end of said weigh beam downwardly.

19. The scale as in claim 18 wherein said weighing device further includes:

a) a flexible fiber connected to said weigh beam second end; and b) a rotary encoder connected to said bridge structure, said encoder having a shaft which engages said flexible fiber such that upward movement of said weigh beam causes rotation of said shaft, rotation of said shaft producing a signal from which the weight acting on said fulcrum can be determined.

20. A scale for weighing moving loads, comprising:

a) a platform having an entrance end and an exit end, said platform supported on a fulcrum between said entrance and exit ends and pivotable relative to said fulcrum;

b) a first limit stop limiting downward movement of said platform entrance end;

c) a second limit stop limiting downward movement of said platform exit end; and d) a weighing device operatively connected to said fulcrum so as to measure weight acting on said fulcrum; wherein e) the weight of a load entering said platform from said entrance end and moving toward said exit end initially causes said entrance end of said platform to pivot downwardly such that said platform engages said first limit stop and the weight is distributed between said fulcrum and said first limit stop, said platform pivoting away from said first limit stop as the load moves toward said fulcrum such that said weighing device can register the weight of the load, and as the load moves past said fulcrum toward said exit end of said platform the weight of the load causes said exit end of said platform to pivot downwardly such that said platform engages said second limit stop and the weight is distributed between said fulcrum and said second limit stop.

* * * * *